United States Patent [19]
Kobayashi

[11] 4,197,570
[45] Apr. 8, 1980

[54] TUBULAR CAPACITOR WITH METAL CAPS

[75] Inventor: Tomiji Kobayashi, Gunma, Japan

[73] Assignee: Taiyo Yuden Co., Ltd., Tokyo, Japan

[21] Appl. No.: 954,840

[22] Filed: Oct. 26, 1978

[30] Foreign Application Priority Data

Nov. 19, 1977 [JP] Japan .................................. 52-139061

[51] Int. Cl.² ............................................. H01G 1/14
[52] U.S. Cl. .................................... 361/310; 361/321
[58] Field of Search ........................ 361/321, 306, 310; 228/154, 136; 338/329, 332

[56] References Cited
U.S. PATENT DOCUMENTS 3,233,028  1/1966  Topdari et al. .................. 361/321 X Primary Examiner—E. A. Goldberg
Attorney, Agent, or Firm—Woodcock, Washburn, Kurtz, Mackiewicz & Norris

[57] ABSTRACT

A pair of metal caps pressed onto the opposite ends of a ceramic dielectric tube have each a plurality of circumferentially spaced inward projections which are embedded in either inner or outer electrodes formed on the ceramic tube. Each inward projection of each metal cap is further soldered to one of the electrodes, preferably by melting a thin solder layer which has plated over the metal cap, thereby establishing or reinforcing the mechanical and electrical contact between electrodes and metal caps. Semiflexible sealing joints consisting essentially of epoxy resin of the bisphenol A type are formed at least between electrodes and metal caps to hermetically seal the capacitor. An external covering comprising one or more layers of plastics material is formed at least over the sealing joints at a region therebetween.

13 Claims, 16 Drawing Figures

TUBULAR CAPACITOR WITH METAL CAPS

BACKGROUND OF THE INVENTION

1. Field of the Invention

My invention relates to capacitors, and more specifically to a tubular type of capacitor having at least two electrodes formed on a tube of ceramic or like dielectric material and held in mechanical and electrical contact with a pair of metal caps pressed onto the opposite ends of the dielectric tube.

2. Description of the Prior Art

Tubular ceramic capacitors of the type in question have had a problem concerning the desired mechanical and electrical contact between electrodes and metal caps. The dielectric tube forming the insulation between the electrodes of the capacitor is usually fabricated by extruding into tubular form a mixture of a ceramic material composed principally of barium titanate ($BaTiO_3$), strontium titanate ($SiTiO_3$) or the like, and a binder. The tubular extrusion is cut into desired lengths, and these are then sintered or heated into coherent bonded bodies for use in capacitors.

The above sintering operation causes contraction of the ceramic tubes to varying degrees, up to approximately 20% of the original size. In view of such inevitable dimensional errors of the ceramic tubes, a pair of metal caps pressed onto the opposite ends of each ceramic tube, following the formation of electrodes thereon, have usually been each slitted to provide a plurality of spring fingers, as disclosed for example in J. E. Toppari et al. U.S. Pat. No. 3,233,028. The use of such slitted metal caps, however, is insufficient to ensure their firm mechanical and electrical contact with the electrodes on the ceramic tube. J. E. Toppari et al. further suggest a plastic insulating case molded around and completely enclosing the capacitor. This measure is still unsatisfactory, however.

Another important problem concerning tubular ceramic capacitors is the maintenance of their desired electrical properties for as long a period of time as possible. This objective can be attained in part by isolating the interior of the ceramic tube from the atmosphere. J. E. Toppari et al. teach to fill the bore of the dielectric tube with a thixotropic gelable silicone dielectric liquid, which is gelled in situ.

It may be contemplated, as an alternative, to form joints of solder or conductive paint between metal caps and electrodes on the ceramic tube, for the accomplishment of the dual objective of mechanically and electrically connecting the metal caps and electrodes and hermetically sealing the interior of the ceramic tube. This measure is objectionable because the solder or conductive paint is likely to flow into the interior of the capacitor thereby short-circuiting the electrodes. As an additional disadvantage, the joints of solder or conductive paint are incapable of withstanding all operating temperatures.

SUMMARY OF THE INVENTION

It is an object of my invention to establish firm mechanical and electrical contact between electrodes and metal caps of a tubular capacitor of the type under consideration, regardless of possible variations in the size of the dielectric tube.

Another object of my invention is to hermetically seal the tubular capacitor without the least possibility of its electrodes being short-circuited.

A further object of my invention is to provide a tubular capacitor which is easy to manufacture.

A further object of my invention is to attain the foregoing objects in tubular capacitors adapted for various applications.

With these and other objects in view, my invention provides, in a capacitor of the type having a tube of dielectric material and at least two electrodes formed thereon, the improvement comprising a pair of metal caps pressed onto the opposite ends of the dielectric tube. Each metal cap has a plurality of inward projections formed at circumferential spacings thereon for engaging one of the electrodes on the dielectric tube. The inward projections of each metal cap are further soldered onto one of the electrodes on the dielectric tube to establish firm mechanical and electrical contact therebetween. Substantially flexible, hermetic sealing joints of electrically insulating material are formed at least between electrodes and metal caps. The capacitor is further provided with an external covering of electrically insulating material overlying at least the sealing joints and a region therebetween.

In a preferred embodiment of my invention, each metal cap is slitted to provide a plurality of gripping fingers, and each inward projection is formed on one of the gripping fingers by indenting the cap from without. Hemispherical or frustoconical in shape, all or some of the inward projections of each metal cap become embedded in one of the electrodes on the dielectric tube when the cap is pressed in place thereon. In another embodiment, each metal cap has notches, instead of the slits, formed in the edge of its open end, and each inward projection is formed adjacent the apex of one of the notches.

The solder layer may be formed by plating over the complete surfaces of each metal cap, for the ease of manufacture. When melted, the solder layer establishes or reinforces the mechanical and electrical contact between all the inward projections of each metal cap and one of the electrodes. The solder plating should be sufficiently thin to obviate the possibility of the electrodes being short-circuited by the molten solder.

The sealing joints are preferably composed of epoxy resin of the bisphenol A type, filler, and hardener, in such proportions that the sealing joints have a Shore hardness rating of 50–80. Such semiflexible sealing joints are little affected by temperatures, besides being excellent in adhesiveness, moisture-proofing ability, and electrical resistivity.

The external covering of the capacitor comprises a phenol resin layer and an epoxy resin layer, with the latter overlying the former, in one embodiment of my invention and a single layer of epoxy resin in another embodiment. Either way, the external covering can be minimized in thickness because the covering is not expected to help maintain the rigid connection between electrodes and metal caps. This objective is amply accomplished by the metal caps themselves which have their inward projections positively engaged with or embedded in the electrodes and further soldered thereto.

The above and other objects, features and advantages of my invention and the manner of attaining them will become more clearly apparent, and the invention itself will best be understood, from the following description and appended claims, taken in connection with the accompanying drawings showing several preferred embodiments of my invention.

DESCRIPTION OF THE PREFERRED EMBODIMENTS

Figure 1:
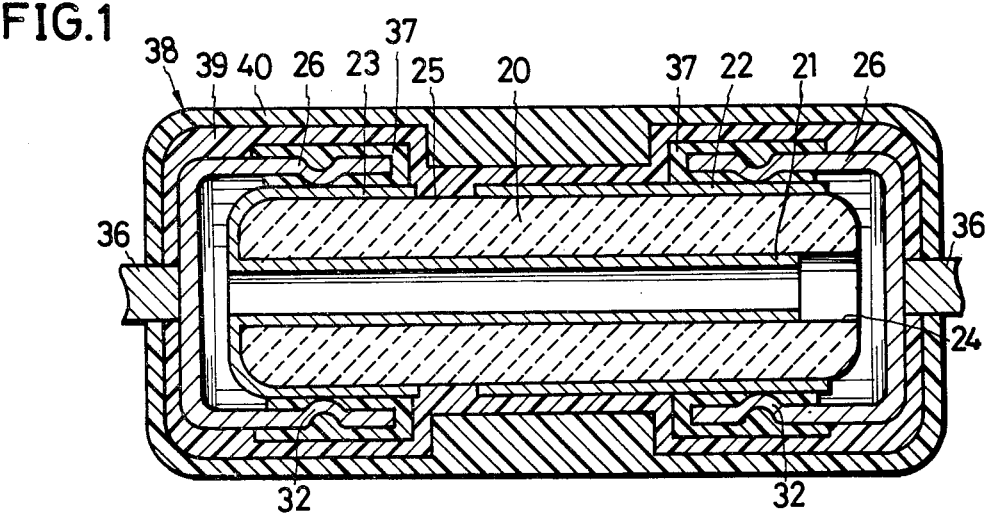
FIG. 1 is an axial sectional view of a preferred form of the tubular capacitor in accordance with my invention.

With reference to FIG. 1 the tubular ceramic capacitor illustrated therein by way of a first preferred embodiment of my invention broadly comprises a tube 20 of ceramic dielectric material, inner 21 and outer 22 electrodes on the ceramic tube, a pair of metal caps 26 pressed onto the opposite ends of the ceramic tube in mechanical and electrical contact with the electrodes, hermetic sealing joints 37 formed between electrodes and metal caps, and an external covering 38 having a phenol resin layer 39 and epoxy resin layer 40 enclosing the capacitor.

Figure 2:
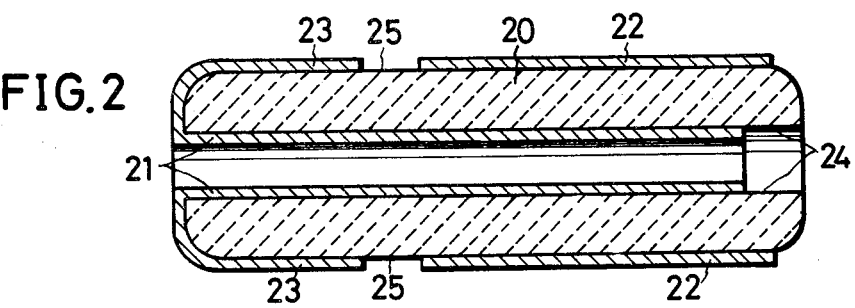
FIG. 2 is an axial sectional view of the ceramic tube and inner and outer electrodes of the capacitor of FIG. 1.

As shown also in FIG. 2, the ceramic tube 20 is formed by extruding and then firing ceramic dielectric material which may be composed principally of strontium titanate, admixed with a binder. The edges at the opposite ends of the ceramic tube 20 are rounded by grinding, for smooth insertion into the metal caps 26.

Both inner 21 and outer 22 electrodes may be coatings of a conductive paint, or "silver paint", composed of powdered silver, glass frit, resin and solvent. The inner electrode 21 has an extension 23 on the outer surface of the left hand end, as seen in FIGS. 1 and 2, of the ceramic tube 20. Thus, both inner 21 and outer 22 electrodes have portions overlying the outer surfaces of the opposite end portions of the ceramic tube 20. The inner electrode 21 terminates short of the right hand end of the ceramic tube 20 to provide an inner insulating band 24. An outer insulating band is formed at 25 between outer electrode 22 and inner electrode extension 23.

The preferred dimensions of the ceramic tube 20 and the electrodes 21 and 22 thereon will now be set forth by way of reference. The ceramic tube 20 has an axial length of 7.00 millimeters, an outside diameter of 1.78 millimeters, and an inside diameter of 1.00 millimeter. The inner 21 and outer 22 electrodes have each a thickness of 10 microns. The total outside diameter of the article of FIG. 2 (i.e., the ceramic tube 20 together with the electrodes 21 and 22 thereon) is therefore approximately 1.8 millimeters. The inner insulating band 24 has a width of 0.30 millimeter. The curvatures formed by grinding the edges at the opposite ends of the ceramic tube 20 have each a radius of 0.25 millimeter.

In the manufacture of the tubular ceramic capacitor according to my invention, the FIG. 2 article is immersed in an approximately 10–40%, preferably 20%, by weight alcohol solution of rosin, with a chlorine content ranging from 0 up to 0.03% by weight. For drying the rosin coating thus formed thereon, the FIG. 2 article is then heated in a temperature range of 150°–170° C., preferably at 165° C., for one hour. A rosin film with a thickness of the order of tenthmeters is thus formed which completely covers the FIG. 2 article, overlying the inner 21 and outer 22 electrodes, the inner 24 and outer 25 insulating bands, and the exposed right hand end of the ceramic tube 20.

Figure 8:
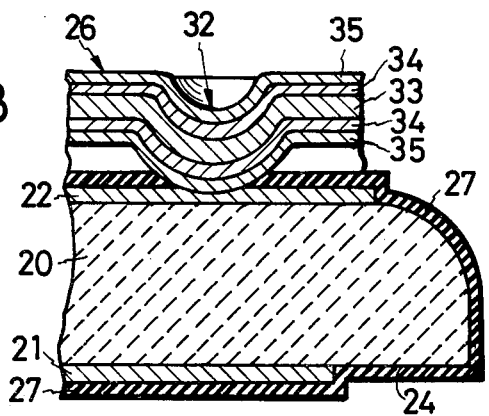
FIG. 8 is an enlarged, fragmentary axial sectional view showing in particular the connection between each inward projection of each metal cap and one of the electrodes on the ceramic tube in the FIG. 1 capacitor.

Being so thin, the rosin film is shown and designated 27 only in FIG. 8, which is the enlarged axial section of the FIG. 2 article and of one of the metal caps 26 pressed in place thereon. This rosin film 27 is effective to facilitate the formation of firm soldered joints (to be described subsequently) between electrodes 21 and 22 and metal caps 26, to protect the electrodes against oxidation, and to moistureproof the capacitor. Having an electrical resistivity of $10^{15}$ ohm-centimeters, moreover, the rosin film 27 further serves to ensure positive insulation between the inner 21 and outer 22 electrodes at the inner 24 and outer 25 insulating bands.

Figure 3:
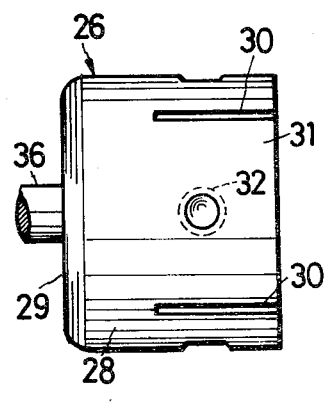
FIG. 3 is a side elevational view of one of the metal caps of the FIG. 1 capacitor.
Figure 4:
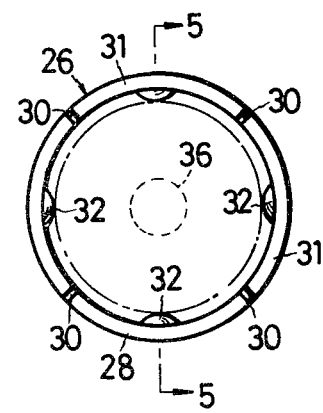
FIG. 4 is the right hand end elevational view of the metal cap of FIG. 3.
Figure 5:
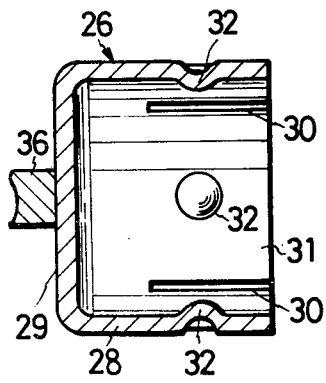
FIG. 5 is a sectional view of the metal cap taken along the line 5—5 in FIG. 4.

The construction of each of the metal caps 26 to be pressed onto the opposite ends of the FIG. 2 article will be apparent from FIGS. 3 through 5. Formed by the pressing of cold-rolled sheet steel, each metal cap 26 comprises a hollow cylindrical portion 28 and an end cover 29 closing one end of the cylindrical portion. The cylindrical portion 28 of each metal cap 26 has a plurality of, four in the illustrated embodiment, slits 30 extending axially from its open end and terminating short of its closed end. These slits 30 divide the cylindrical cap portion 28 into four gripping fingers 31 which conform to the FIG. 2 article when the metal caps 26 are pressed in place thereon.

Each of the four gripping fingers 31 of each metal cap 26 has an inward projection 32 formed by indenting the cylindrical cap portion 28 from without, for engaging or being embedded in either of the electrodes 21 and 22 as best seen in FIG. 8. Each projection 32 can be either hemispherical or frustoconical in shape so that the metal caps 26 may be smoothly pressed in place. The outside diameter of the electrodes 21 and 22, indicated by the dot-and-dash line in FIG. 4, is slightly more than a notional circle tangent to the tips of the four projections 32 of each metal cap 26.

The preferred dimensions of each metal cap 26 are as follows. The metal cap 26 as a whole has a thickness of 0.15 millimeter. Its cylindrical portion 28 has an inside diameter of 1.85 millimeters and an outside diameter of 2.15 millimeters. The notional circle tangent to the tips of the four projections 32, arranged at approximately constant circumferential spacings on the cylindrical cap portion 28, has a diameter of 1.75 millimeters. Each projection 32 has therefore a height of 0.05 millimeter. Each metal cap 26 has a depth (i.e., the axial length between its open end and the inside surface of its end cover 29) is 1.40 millimeters. Each having a width of 0.05 millimeter, the slits 30 extend from the open end of the cap toward its closed end approximately two thirds of the cap depth. The diameter of the notional circle tangent to the tips of the four projections 32 of each metal cap 26 ranges from 93.8 to 99.8%, preferably from 93.8 to 99.5%, and most desirably from 97.1 to 97.6%, of the outside diameter of the electrodes 21 and 22.

Should the diameter of the above notional circle be greater than the above specified maximum value, the metal caps 26 would more or less loosely fit over the ends of the FIG. 2 article, making poor electrical and mechanical contact with the electrodes 21 and 22. The loss factor of the completed capacitor would also be high. Should the diameter of the notional circle be less than the above specified minimum value, on the other hand, then the ceramic tube 20 might suffer microfissures or other damage when the metal caps 26 are forrced onto its opposite ends. Also the completed capacitor would not have the desired values of capacitance, loss factor, and insulation resistance.

The height of each inward projection 32 of the metal caps 26 may range from 0.03 to 0.05%, preferably from 0.03 to 0.04%, of the outside diameter (1.80 millimeters in this embodiment) of the electrodes 21 and 22.

Each metal cap 26 is required to undergo deformation, in the manner to be explained presently, when pressed in place on the FIG. 2 article, increasing in the diameter of its cylindrical portion 28. The metal caps 26 should therefore be annealed, for example, at a temperature of 600° C. for 30 minutes. By virtue of this annealing treatment and of the slits 30 formed therein, the cylindrical portion 28 of each metal cap 26 can be compressed into elliptic cross-sectional shape, by approximately 20% of its original shape, when pressed under a pressure of 1.3 kilograms. The metal caps of this deformation characteristic are quite suitable for use in the tubular ceramic capacitor of my invention. Metal caps of a similar deformation characteristic can also be obtained by making them from brass and by annealing them at a temperature of 500° C. for 20 minutes.

As clearly depicted in FIG. 8, each metal cap 26 has formed on its steel substrate 33 a plated copper layer 34 with a thickness of one micron overlying both inner and outer surfaces of the substrate, and a plated solder layer 35 further overlying the plated copper layer. The solder layer 35 is composed of 8–12%, preferably 10%, by weight lead and 88–92%, preferably 90%, by weight tin. This solder layer 35 is melted in situ to form soldered joints between metal cap projections 32 and electrodes 21 and 22, but not to form hermetic seals between metal caps and electrodes. The thickness of the solder layer 35 can therefore be as small as 3–10 microns. Although in FIG. 8 the solder layer 35 is shown to be plated over the entire surfaces of the metal cap, the solder layer could of course be formed only over its inward projections 32, as by painting.

Figure 6:
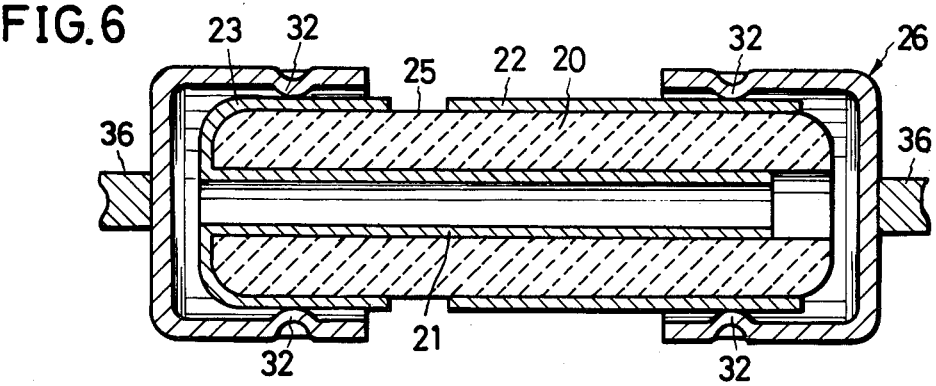
FIG. 6 is a view similar to FIG. 2 except that the pair of metal caps of FIGS. 3 through 5 are shown mounted in place on the ceramic tube.

When the pair of metal caps 26 are pressed onto the opposite ends of the FIG. 2 article as shown in FIG. 6, their cylindrical portions 28 initially undergo elastic deformation due principally to the provision of the slits 30 therein. The deformation of the cylindrical cap portions 28 proceeds beyond their elastic limit. Ultimately, undergoing plastic deformation, the metal caps 26 have their inward projections 32 engaged with or embedded in the inner 21 and outer 22 electrodes for mechanical and electrical contact therewith. The metal cap projections 32 will be smoothly engaged with or embedded in the electrodes 21 and 22 since the ceramic tube 20 has its ends rounded and since the projections 32 are each hemispherical or frustoconical in shape.

As noted earlier, some manufacturing errors must be tolerated in the otuside diameter of the ceramic tubes. It is therefore likely that one or more of the four inward projections 32 of each metal cap 26 do not make proper engagement with one of the electrodes 21 and 22. This presents no problem at all, however, since the article of FIG. 6 (i.e., the FIG. 2 article plus the metal caps 26 mounted in place thereon) is heated (e.g., at a temperature of 350° C. for 30 seconds) to melt the outermost solder layer 35 of each metal cap and hence to form soldered joints between its inward projections 32 and one of the electrodes 21 and 22. Firm mechanical and electrical contact can thus be established between electrodes 21 and 22 and metal caps 26. Even in the case where all the metal cap projections 32 have already been securely embedded in the electrodes 21 and 22, the soldered joints formed as above serve to reinforce the connection therebetween. The formation of these soldered joints is aided by the aforesaid rosin film 27 covering the FIG. 2 article.

Each metal cap 26 is provided with a wire lead 36 attached centrally to its end cover 29, as by electric welding. The pair of wire leads 36 are of course intended for use in electrically connecting the capacitor to external circuitry.

Figure 7:
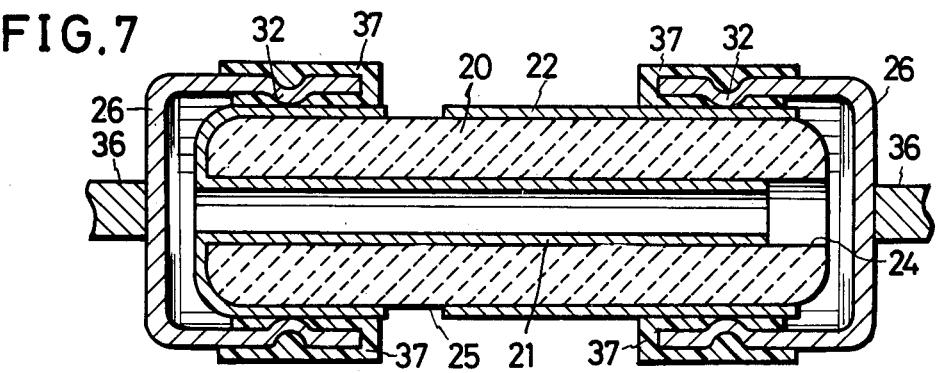
FIG. 7 is a view similar to FIG. 6 except that the sealing joints are formed between electrodes and metal caps.

In FIG. 7 are shown the joints 37 hermetrically sealing the junctions between electrodes 21 and 22 and metal caps 26. These sealing joints 37 are formed by coating an insulating paint composed of epoxy resin of the bisphenol A type, filler, and hardener. The sealing joint portions overlying the metal caps 26 have each a thickness of approximately 70 microns. The slits 30 in the metal caps 26 are of course closed by the sealing joints 37. These slits are so narrow (0.05 millimeter) that they can be easily closed by the insulating paint. Although the sealing joints 37 may partly intrude into the interior of the metal caps 26, there is absolutely no fear of the electrodes 21 and 22 being short-circuited since the joints are of insulating material.

The sealing joints 37 are required to possess such properties as immunity to widely varying temperatures, adhesiveness, resistance to moisture, and electrical resistivity. These requirements can be met by compounding the insulating paint of, in addition to epoxy resin of the bisphenol A type, 31.5% by weight of the filler composed of talc [$Mg_3Si_4O_{10}(OH)_2$], calcium carbonate ($CaCO_3$) and silica ($SiO_2$), and the hardener composed of acid anhydride.

Having a viscosity of 48,000 centipoises, the insulating paint of the above composition has been found to provide sealing joints capable of withstanding temperatures of $-65°$ to $130°$ C. and having a Shore hardness rating of 65. The water absorption rate of the sealing joints 37, after having been boiled for one hour, was less than 0.1%. The bond strength provided by the sealing joints 37 between electrodes 21 and 22 and metal caps 26 was 100 kilograms per square centimeter. The electrical resistance of the sealing joints 37 was $2.7 \times 10^{14}$ ohm-centimeters. The hermetic sealing ability of the joints 37 is also excellent, since no sustained air bubbles were produced when the FIG. 7 article was immersed in a sealing test solution heated to a temperature of $125°$ C.

Generally, the sealing joints 37 should have a Shore hardness rating ranging from 50 to 80, most desirably 65, to withstand the temperatures of $-65°$ to $130°$ C. The sealing joints with this range of hardness can be obtained by admixing epoxy resin of the bisphenol A type with 25–35% by weight of the filler. Aside from the noted mixture of $Mg_3Si_4(OH)_2$, $CaCO_3$ and $SiO_2$, the filler can also be composed of any one or two selected ones of these compounds or may be of other commercially available compositions.

The sealing joints 37 may not necessarily be composed principally of epoxy resin of the bisphenol A type, but of polybutadiene resin, polyurethane resin, silicone elastomer, or epoxy resin of other than the bisphenol A type, admixed with a suitable filler. In some instances a filler may not be employed.

With reference back to FIG. 1, the external covering 38 is formed over the FIG. 7 article so as to completely enclose same. The external covering 38 of the FIG. 1 capacitor is shown to comprise the first layer 39 of phenol resin and the second layer 40 of epoxy resin, with the latter overlying the former. The outside diameter of the completed capacitor is 2.7 millimeters.

It should be noted that the external covering 38 can be minimized in thickness since the covering is expected to make little or no contribution to the maintenance of the mechanical and electrical contact between electrodes 21 and 22 and metal caps 26. The desired connection between electrodes and metal caps can be maintained by the metal caps themselves which are positively pressed in place, with their projections 32 further soldered onto the electrodes, and by the sealing joints 37.

The tubular ceramic capacitor of the foregoing construction has the following advantages:

1. The inner 21 and outer 22 electrodes are not to be short-circuited by the intrusion of the sealing joints 37 between electrodes and metal caps, because the sealing joints are formed by the insulating paint.

2. The sealing joints 37 are semiflexible, withstanding the temperatures of $-65°$ to $130°$ C.

3. The sealing joints 37 have sufficient adhesiveness and moistureproofing ability to protect the interior of the ceramic tube 20.

4. Each metal cap 26 has the plated solder layer 35, which is melted to establish or reinforce the mechanical and electrical contact between electrodes 21 and 22 and metal cap projections 32.

5. The rosin film 27 covering the FIG. 2 article facilitates the formation of the soldered joints between electrodes and metal cap projections and serves also to protect the electrodes against oxidation, to moistureproof the capacitor, and to ensure insulation of the electrodes from each other.

6. The metal caps 26 can be readily pressed in place on the ceramic tube 20 because the latter has its opposite end edges rounded.

7. The external covering 38 can be of minimum thickness because the metal caps 26 are firmly engaged with the electrodes 21 and 22 by the noted means other than the external covering and because the junctions between electrodes and metal caps are hermetically sealed by the sealing joints 37.

SECOND FORM

Figure 9:
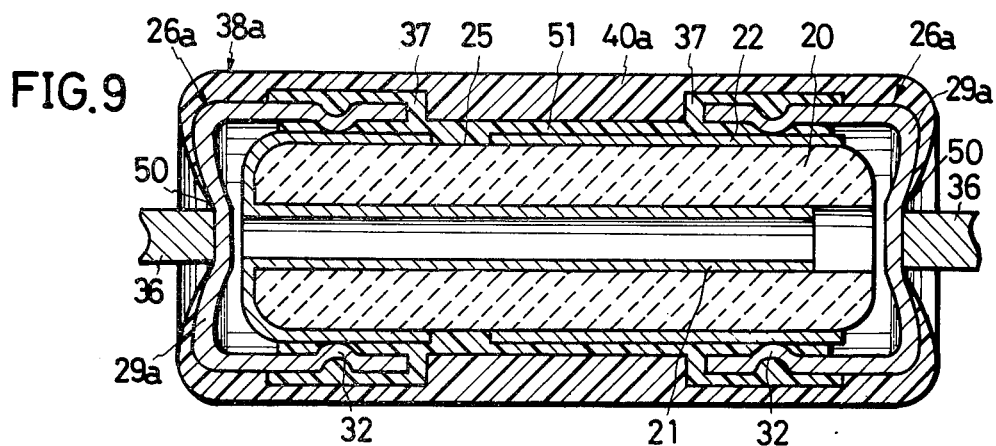
FIG. 9 is an axial sectional view of another preferred form of the tubular capacitor in accordance with my invention.

In FIG. 9 is shown another preferred embodiment of my invention. Most parts of this FIG. 9 capacitor will be readily identified since the same reference numerals are used to denote the corresponding parts of the FIGS. 1 and 9 capacitors. Although not seen in FIG. 9, the rosin film 27 is assumed to be formed over the entire exposed surfaces of the ceramic tube 20 and the electrodes 21 and 22 thereon, for the purposes set forth previously.

A pair of metal caps pressed onto the opposite ends of the ceramic tube 20 are designated 26a because they differ from the metal caps 26 of the FIG. 1 capacitor in that an indentation 50 is formed centrally in the end cover 29a of each metal cap 26a. Each wire lead 36 is soldered onto the end cover 29a of one of the metal caps 26a at its central indentation 50. The other details of construction of the metal caps 26a are identical with those of the metal caps 26. It is also understood that the inward projections 32 of the metal caps 26a are soldered onto the electrodes 21 and 22 by melting the plated solder layer (not seen in FIG. 9) covering each metal cap or at least its inward projection.

Another difference of the FIG. 9 capacitor from that of FIG. 1 is that the sealing joints 37 include an integral bridge portion 51 lying between the pair of metal caps 26a and covering part of the outer electrode 22 and all of the outer insulating band 25. The bridge portion 51 is of course fabricated from the same insulating paint as the sealing joints 37. The sealing joints 37 complete with the bridge portion 51 are intended not only to hermetically seal the capacitor but also to moistureproof same.

Since the sealing joints 37 with the integral bridge portion 51 serve the additional purpose of moistureproofing the capacitor, the external covering 38a of this FIG. 9 capacitor can be a single layer 40a of epoxy resin. During the formation of this epoxy resin layer 40a, the indented end covers 29a of the metal caps 26a serve to minimize the possibility of the molten epoxy resin flowing to the leads 36. The adhesion of the epoxy resin to the leads is undesirable since the electrical connection of the capacitor to external circuitry might be impeded by the adhering resin.

Figure 10:
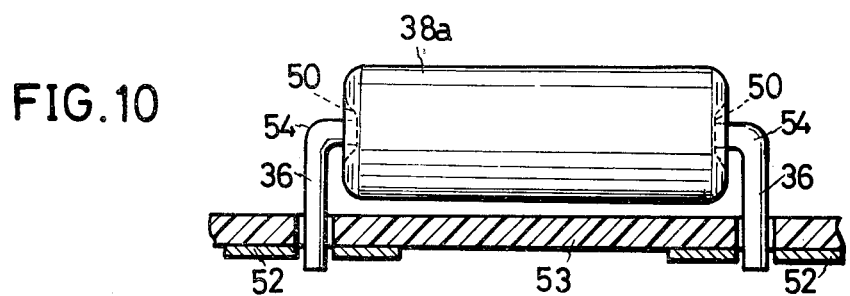
FIG. 10 is a side elevational view, partly in section, showing the FIG. 9 capacitor as mounted on a printed circuit board for use.

The indentations 50 in the metal cap end covers 29a serve the additional purpose of aiding in soldering the leads 36 to the exact centers of the end covers. Furthermore, in electrically connecting the capacitor to desired conductors 52 of external circuitry on a base 53 by bending the leads 36 as shown in FIG. 10, the bends 54 of the leads can be formed close to the ends of the capacitor. The distance between the bends 54 of the pair of leads 36 can therefore be minimized, resulting in the requirement of minimum installation space for the capacitor.

In view of the above functions or advantages of the metal cap end cover indentations 50, each indentation should have a depth of 0.1–0.4 millimeter, provided that each metal cap 26a has the same dimensions as the preferred dimensions of the metal caps 26 set forth previously. The diameter of each indentation 50 should be slightly more than that of each lead 36. Thus, if the lead diameter is 0.6 millimeter, for example, then the indentation diameter may be 0.8 millimeter. It will be seen that the FIG. 9 capacitor also gains the seven advantages enumerated in connection with the FIG. 1 capacitor, in addition to the noted advantages obtained by the metal cap end cover indentations 50.

THIRD FORM

Figure 11:
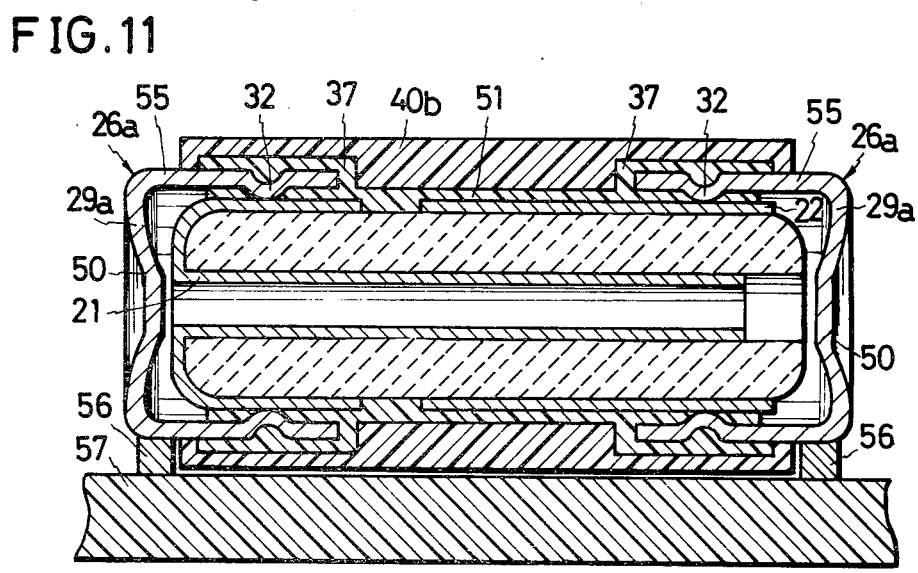
FIG. 11 is an axial sectional view of still another preferred form of the tubular capacitor in accordance with my invention, the view also showing in section a printed circuit board on which the capacitor is mounted for use.

Most parts of the capacitor shown in FIG. 11 by way of a further preferred embodiment of my invention are also designated by the same reference characters as used to denote the corresponding parts of the FIG. 1 or 9 capacitor. The FIG. 11 capacitor is identical with that of FIG. 9 in that the pair of metal caps 26a have each the indentation 50 formed centrally in its end cover 29a, but differs therefrom in that the metal caps have no leads connected thereto.

Also like the FIG. 9 capacitor, the FIG. 11 capacitor has the sealing joints 37 formed complete with the integral bridge portion 51. The external covering of the FIG. 11 capacitor has a single layer 40b of epoxy resin or the like which overlies the sealing joints 37, their integral bridge portion 51, and parts of the metal caps 26a, leaving exposed parts 55 of the metal cap cylindrical portions 28. Instead of the leads 36 of the FIGS. 1 and 9 capacitors, these exposed parts 55 of the metal cap cylindrical portions 28 serve to electrically connect the FIG. 11 capacitor to conductors 56 of external circuitry on a base 57. The other details of construction of the FIG. 11 capacitor, and the advantages thereof, are as set forth above in connection with the FIG. 1 or 9 capacitor.

MODIFICATIONS

Figure 12:
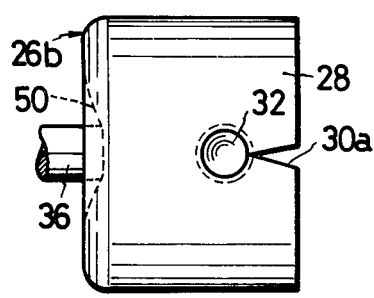
FIG. 12 is a side elevational view of a modified metal cap for use in the tubular capacitor of my invention.
Figure 13:
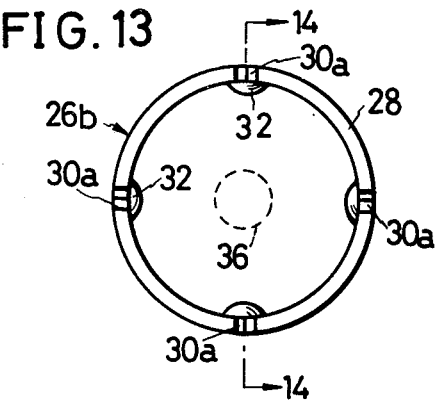
FIG. 13 is the right hand end elevational view of the modified metal cap of FIG. 12.
Figure 14:
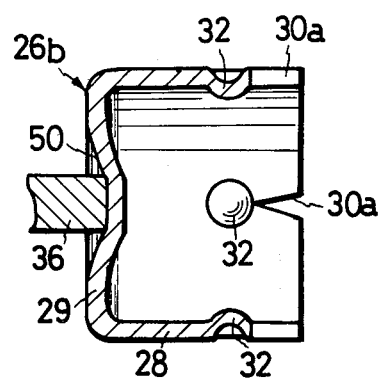
FIG. 14 is a sectional view of the modified metal cap taken along the line 14—14 in FIG. 13.

In FIGS. 12 through 14 is shown a modified metal cap 26b which can also be employed in the various tubular capacitors of my invention. The modified metal cap 26b has a plurality of, four in the illustrated embodiment, notches 30a formed in the open end edge of its cylindrical portion 28. With the metal cap 26b assumed to have the same dimensions as the cap 26 of the FIG. 1 capacitor, each notch 30a has a width, as measured at the open end of the cap, of 2.2 millimeters and a length, as measured in the axial direction of the cap, of 0.28 millimeter, which length is approximately one fifth the depth of the cylindrical cap portion 28.

Each inward projection 32 of the metal cap 26b is formed adjacent to the apex of one of the notches 30a. The projections 32 have the same height as the projections on each metal cap 26 of the FIG. 1 capacitor. The end cover 29 of the metal cap 26b is shown to have the indentation 50 formed centrally therein, and the lead 36 is soldered onto the indented end cover 29.

The pair of metal caps 26b, each constructed as in the foregoing, can be employed in lieu of the metal caps 26 of the FIG. 1 capacitor or of the metal caps 26a of the FIG. 9 capacitor. Also, by removing the leads 36, the metal caps 26b can be employed in lieu of the metal caps 26a of the FIG. 11 capacitor.

When pressed onto the opposite ends of the ceramic tube 20, the pair of metal caps 26b undergo elastic, and then plastic, deformation, just like the metal caps 26 or 26a, with the consequent embedment of the inward projections 32 in the inner 21 and outer 22 electrodes on the ceramic tube. The notched part of the cylindrical portion 28 of each metal cap 26b is of course deformed so as to increase in diameter, thereby helping the metal cap to be pressed in place.

Figure 15:
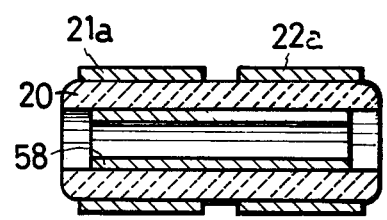
FIG. 15 is an axial sectional view showing the dielectric tube and electrodes of a modified capacitor to which my invention is applicable.

FIG. 15 is a schematic representation of a different type of tubular capacitor to which my invention is also applicable. The capacitor has first 21a and second 22a electrodes formed on the outer surfaces of the opposite end portions of the ceramic tube 20, and a third electrode 58 formed on the inner surface of the ceramic tube in opposed relationship to both first and second electrodes. In this type of capacitor the capacitance between first 21a and third 58 electrodes and the capacitance between second 22a and third 58 electrodes are interconnected serially. The pair of metal caps 26, 26a or 26b are to be mounted on the opposite ends of the ceramic tube 20 in mechanical and electrical contact with the first 21a and second 22a electrodes. Although not illustrated, the other details of construction of this FIG. 15 capacitor will be apparent from the foregoing description.

Figure 16:
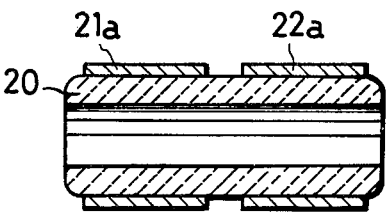
FIG. 16 is also an axial sectional view showing the dielectric tube and electrodes of another modified capacitor to which my invention is applicable.

In another different type of tubular capacitor shown in FIG. 16, to which my invention is also applicable, the ceramic tube 20 has only the first 21a and second 22a electrodes formed on the outer surfaces of its opposite end portions. The capacitor of this type provides a capacitance of 0.1–5 picofarads. The pair of metal caps 26, 26a or 26b are to be mounted in mechanical and electrical contact with the first 21a and second 22a electrodes. The other details of construction of this FIG. 16 capacitor will also be apparent from the foregoing description.

Although I have shown and described my invention in terms of several specific embodiments thereof, it will of course be understood that my invention is not to be restricted by the exact details of this disclosure but is inclusive of numerous modifications or changes within the broad teaching hereof. For example, the ceramic tube may not necessarily be composed principally of strontium titanate, but of barium titanate or titanium oxide. Further, each electrode on the ceramic tube may be of two layers consisting of, for example, nickel plating and solder plating, or of three layers consisting of, for example, baked silver coating, nickel plating and solder plating. Many other modifications or changes will readily occur to those skilled in the art without departing from the spirit or scope of my invention as expressed in the following claims.

I claim:

1. A capacitor of the type including a tube of dielectric material and at least two electrodes formed thereon, the electrodes overlying at least the outer surfaces of the opposite end portions of the dielectric tube, wherein the improvement comprises:
   (a) a pair of metal caps pressed onto the opposite ends of the dielectric tube;
   (b) each metal cap having a plurality of inward projections formed at circumferential spacings thereon, the inward projections of each metal cap being engaged with one of the electrodes on the dielectric tube;

(c) a soldered joint formed between each inward projection of each metal cap and one of the electrodes on the dielectric tube to firmly establish or reinforce mechanical and electrical contact between the electrodes and the metal caps;

(d) substantially flexible, hermetic sealing joints of electrically insulating material formed at least between the electrodes and the metal caps; and (e) an external covering of electrically insulating material overlying at least the sealing joints and a region therebetween.

2. The capacitor as set forth in claim 1, wherein each metal cap comprises a hollow cylindrical portion and an end cover closing one end of the cylindrical portion, the cylindrical portion of each metal cap having formed therein a plurality of slits dividing same into a plurality of gripping fingers, and wherein the inward projections of each metal cap are formed one on each gripping finger.

3. The capacitor as set forth in claim 1, wherein each metal cap comprises a hollow cylindrical portion and an end cover closing one end of the cylindrical portion, the cylindrical portion of each metal cap having a plurality of notches formed in the edge of its open end, and wherein the inward projections of each metal cap are formed one adjacent to the apex of each notch.

4. The capacitor as set forth in claims 2 or 3, wherein the end cover of each metal cap has a lead connected thereto.

5. The capacitor as set forth in claims 2 or 3, wherein the cylindrical portion of each metal cap has a portion left uncovered by one of the sealing joints or by the external covering.

6. The capacitor as set forth in claims 2 or 3, wherein each metal cap has an indentation formed centrally in its end cover.

7. The capacitor as set forth in claim 6, wherein each metal cap has a lead connected to its end cover at its central indentation.

8. The capacitor as set forth in claim 1, wherein the sealing joints have a Shore hardness rating of 50–80.

9. The capacitor as set forth in claim 8, wherein the sealing joints consist essentially of epoxy resin of the bisphenol A type.

10. The capacitor as set forth in claim 9, wherein the sealing joints further comprise 25–35% by weight filler and acid anhydride by way of a hardener.

11. The capacitor as set forth in claims 1, 8, 9 or 10, wherein the external covering comprises a first layer consisting essentially of phenol resin, and a second layer overlying the first layer and consisting essentially of epoxy resin.

12. The capacitor as set forth in claims 1, 8, 9 or 10, wherein the sealing joints integrally include a bridge portion which lies between the pair of metal caps and which is fabricated from the same material as the sealing joints, and wherein the external covering overlies the sealing joints, the bridge portion therebetween, and at least parts of the exposed surface portions of the metal caps.

13. The capacitor as set forth in claim 12, wherein the external covering consists essentially of epoxy resin.

* * * * *